(12) United States Patent
Michael et al.

(10) Patent No.: US 11,158,039 B2
(45) Date of Patent: Oct. 26, 2021

(54) USING 3D VISION FOR AUTOMATED INDUSTRIAL INSPECTION

(71) Applicant: COGNEX CORPORATION, Natick, MA (US)

(72) Inventors: David J Michael, Wayland, MA (US); Gang Liu, Natick, MA (US); Ali Zadeh, Hopkinton, MA (US)

(73) Assignee: COGNEX CORPORATION, Natick, MA (US)

(*) Notice: Subject to any disclaimer, the term of this patent is extended or adjusted under 35 U.S.C. 154(b) by 381 days.

(21) Appl. No.: 15/192,087

(22) Filed: Jun. 24, 2016

(65) Prior Publication Data

US 2016/0379351 A1  Dec. 29, 2016

Related U.S. Application Data

(60) Provisional application No. 62/185,444, filed on Jun. 26, 2015, provisional application No. 62/280,625, filed on Jan. 19, 2016.

(51) Int. Cl.
*G06T 7/00* (2017.01)
*G06T 7/33* (2017.01)

(52) U.S. Cl.
CPC .............. *G06T 7/001* (2013.01); *G06T 7/337* (2017.01); *G06T 2207/10028* (2013.01); *G06T 2207/20081* (2013.01); *G06T 2207/30108* (2013.01)

(58) Field of Classification Search
CPC .. H04N 13/161; H04N 13/178; H04N 13/189; H04N 13/204; H04N 13/232; H04N 13/243; H04N 13/271; H04N 19/467; H04N 19/597; H04N 5/2253; H04N 5/2254; H04N 5/23212; H04N 5/23238; H04N 5/23296; H04N 5/247; H04N 5/2624; H04N 5/3415; H04N 5/3572; H04N 9/045; H04N 9/0451
See application file for complete search history.

(56) References Cited

U.S. PATENT DOCUMENTS 5,640,200 A   6/1997  Michael
5,808,735 A   9/1998  Lee et al.
(Continued)

FOREIGN PATENT DOCUMENTS

EP   2275989 A1    1/2011
JP   2002039962 A  2/2002
(Continued)

OTHER PUBLICATIONS

Bernard, Reverse Engineering for Rapid Product Development: A State of the Art, SPIE, 1999, 3835:50-63.
(Continued)

*Primary Examiner* — Samira Monshi
(74) *Attorney, Agent, or Firm* — Quarles & Brady LLP

(57) ABSTRACT

A system and method for three dimensional (3D) vision inspection using a 3D vision system. The system and method comprising acquiring at least one 3D image of a 3D object using the 3D vision system, using the 3D vision system; extracting a 3D visible runtime mask of the 3D image; using the 3D vision system, comparing the 3D runtime visible mask to a 3D reference visible mask; and, using the 3D vision system, determining if a difference of pixels exists between the 3D runtime visible mask and the 3D reference visible mask.

18 Claims, 8 Drawing Sheets

(56) References Cited

U.S. PATENT DOCUMENTS

| | | | | |
|---|---|---|---|---|
| 6,091,845 | A | * | 7/2000 | Pierrat ............. G01N 21/95607 382/144 |
| 2004/0184653 | A1 | * | 9/2004 | Baer ................ G01N 21/95684 382/145 |
| 2007/0003117 | A1 | * | 1/2007 | Wheeler .................. G06T 7/001 382/128 |
| 2011/0286659 | A1 | * | 11/2011 | Saeki ....................... G06T 7/001 382/152 |
| 2014/0132729 | A1 | | 5/2014 | Foulk et al. |

FOREIGN PATENT DOCUMENTS

| | | | |
|---|---|---|---|
| JP | 2004201085 | A | 7/2004 |
| JP | 2009145285 | A | 7/2009 |
| JP | 2010230452 | A | 10/2010 |
| JP | 2011214903 | A | 10/2011 |
| JP | 2012021919 | A | 2/2012 |
| JP | 2014109530 | A | 6/2014 |
| WO | 9718523 | A2 | 5/1997 |

OTHER PUBLICATIONS

Guehring, Reliable 3D Surface Acquisition, Registration and Validation Using Statistical Error Models, Third International Conference on 3-D Digital Imaging and Modeling, 2001, IEEE, pp. 224-231.

Newman, et al., A System for 3D CAD-Based Inspection Using Range Images, Pattern Recognition, 1995, 28 (10):1555-1574.

Prieto, et al., Visual System for Fast and Automated Inspection of 3D Parts, International Journal of CAD/CAM and Computer Graphic, 1998, 13(4):211-227.

European Patent Office, Partial European Search Report, Application No. 16176181.2, dated Dec. 7, 2016.

Tremblay, David; 3-D Vision Improves Performance of Challenging Inspection Application; Quality Magazine; 5 pages; Dec. 10, 2014.

Agin, Gerald J.; Computer Vision Systems for Industrial Inspection and Assembly; Nay 1980 IEEE; pp. 11-20; May 1980.

Malamas, et al; A Survey on Industrial Vision Systems, Applications and Tools; 38 pages, 2003.

Hussmann et al.; A Review on Commercial Solid State 3D Cameras for Machine Vision Applications; Recent Advances in Topography Research; ISBN; 2013 Nova Science Publishers, Inc.; pp. 303-351; 2013.

Jia, Jiancheng; A Machine Vision Application for Industrial Assembly Inspection; 2009 Second International Conference on Machine Vision; pp. 172-176; 2009.

Szeliski, Richard; Computer Vision: Algorithms and Applications Which is available in draft electronically http://szeliski.org/Book/drafts/SzeliskiBook_20100903_draft.pdf; chapter 1, pp. 1-28.; Sep. 3, 2010.

PCL point cloud library; http://pointclouds.org/; Sep. 1, 2016.

3DTK The 3D Toolkit; http://slam6d.sourceforge.net/; Sep. 1, 2016.

CloudCompare; http://www.danielgm.net/cc/; Sep. 1, 2016.

European Patent Office, Extended Search Report, Application No. 19150196.4, dated Apr. 17, 2019, 15 pages.

Zhong, et al., Automatic Registration Technology of Point Cloud Based on Improved ICP Algorithm, Control Engineering of China, 2014, 21(1):37-40.

* cited by examiner

| DS925B / 1000 SPECS | 925B | 1050 | 1101 | 1300 |
|---|---|---|---|---|
| CLEARANCE DISTANCE (mm) | 53.5 | 87 | 135 | 180 |
| NEAR FOV (mm) | 23.4 | 43 | 64 | 90 |
| FAR FOV (mm) | 29.1 | 79 | 162 | 410 |
| MEASUREMENT RANGE (mm) | 25 | 76 | 220 | 725 |
| Z RESOLUTION (mm) | 0.002 | 0.004 TO 0.014 | 0.010 TO 0.052 | 0.016 TO 0.265 |
| X RESOLUTION (mm) | 0.0183 TO 0.0227 | 0.059 TO 0.090 | 0.079 TO 0.181 | 0.101 TO 0.457 |
| MAX SCAN SPEED | 1.2 KHz | UP TO 10 KHz | UP TO 10 KHz | UP TO 10 KHz |
| LASER COLOR (CLASS 2M) | BLUE @405nm | RED @660nm | RED @660nm | RED @660nm |

FIG. 5

USING 3D VISION FOR AUTOMATED INDUSTRIAL INSPECTION

CROSS REFERENCE TO RELATED APPLICATIONS

This application claims priority to, and the benefit of, U.S. Provisional Patent Application Ser. No. 62/185,444, filed Jun. 26, 2015, and entitled "USING 3D VISION FOR AUTOMATED INDUSTRIAL INSPECTION," which is hereby incorporated by reference.

This application also claims priority to, and the benefit of, U.S. Provisional Patent Application Ser. No. 62/280,625, filed Jan. 19, 2016, and entitled "USING 3D VISION FOR AUTOMATED INDUSTRIAL INSPECTION," which is hereby incorporated by reference.

STATEMENT OF FEDERALLY SPONSORED RESEARCH OR DEVELOPMENT

Not applicable.

FIELD OF THE INVENTION

Industrial computer vision is increasingly adopting 3D imagery as an additional data source for inspection. This application explores using 3D image data for automated visual inspection in industrial computer vision systems. The following disclosure provides systems and methods for automated visual industrial inspection, walks through the differences between 3D industrial inspection and 2D industrial inspection, and gives the technical details behind an automated 3D industrial inspection approach, including an example.

BACKGROUND

While industrial computer vision uses many of the same algorithms and approaches as academic/educational and governmental/military applications of computer vision, constraints are different. An industrial computer vision system can imply greater robustness, reliability, and stability compared with an academic/educational computer vision system. It can also imply lower cost compared with governmental/military applications. Compared with other application domains of computer vision, an automated industrial inspection system can imply low cost, acceptable accuracy, high robustness, high reliability, and high mechanical and temperature stability that is commensurate with that of the underlying or accompanying manufacturing process being inspected.

In order for an industrial computer vision system to be reliable, each of its components, both hardware and software, need to be reliable. Cameras are one of the key hardware components. Consumer grade 3D cameras are appearing in consumer applications. Examples of these cameras are time-of-flight cameras like Kinect V2 from Microsoft, stereo cameras like Realsense 3D from Intel, and light field measurement cameras like ILLUM from Lytro. These cameras are not reliable enough to be used in industrial applications, but the same imaging principles as well as those based on structured illumination are used for industrial 3D cameras.

Techniques for automatically visually inspecting objects using 2D images are known in the art. For example, see U.S. Pat. No. 5,640,200, "Golden Template Comparison Using Efficient Image Registration," 17 Jun. 1997, to David J. Michael, and which is herein incorporated by reference in its entirety. In using 2D images for inspection, a 3D image can be converted into a 2D image and subsequently inspected as a 2D image. However, doing so results in lost information about the 3D shape or volume. Inspecting 2D images converted from 3D images can also bias the inspection results towards what features are most visible in the converted 2D image. Techniques for converting 3D images into 2D images by either slicing 3D data or mathematically projecting the 3D data into 2D images is known in the computer graphics rendering art.

In contrast with the 2D inspection discussed above, directly inspecting 3D point clouds is not known in the art. The specification herein describes 3D inspection techniques for directly inspected 3D images and consequently applying those techniques directly to treat patches of 3D data.

SUMMARY OF THE INVENTION

The present embodiments overcome the disadvantages of the prior art by providing systems and methods for three dimensional (3D) vision inspection using a 3D vision system. The systems and methods comprise: acquiring at least one 3D image of a 3D object using the 3D vision system; using the 3D vision system, extracting a 3D visible runtime mask of the 3D image; using the 3D vision system, comparing the 3D runtime visible mask to a 3D reference visible mask; and using the 3D vision system, determining if a difference of pixels exists between the 3D runtime visible mask and the 3D reference visible mask.

In accordance with another embodiment of the invention, methods are disclosed for three dimensional (3D) vision inspection using a 3D vision system. The methods comprise acquiring at least one 3D image of a 3D object using the 3D vision system; using the 3D vision system, registering the at least one 3D image to a 3D reference image; using the 3D vision system, comparing the registered at least one 3D image to the 3D reference image; and using the 3D vision system, detecting a 3D difference between the registered at least one 3D image and the 3D reference image, wherein the 3D difference exceeds a 3D variance model.

In some embodiments, the method further includes filtering the at least one 3D image; and wherein registering the at least one 3D image to the 3D reference image includes registering the at least one filtered 3D image to the 3D reference image.

In some embodiments, the method further includes filtering the registered at least one filtered 3D image; and wherein comparing the registered at least one filtered 3D image to the 3D reference image includes comparing the filtered registered at least one filtered 3D image to the 3D reference image.

In some embodiments, detecting the 3D difference between the registered at least one 3D image and the 3D reference image includes detecting the 3D difference between the registered at least one filtered 3D image and the 3D reference image.

In some embodiments, the method further includes training the 3D vision system, the training including: acquiring at least one 3D training image of the 3D object using the 3D vision system; using the 3D vision system, estimating the 3D reference image based on the at least one 3D training image; and using the 3D vision system, estimating a 3D variance model based on the 3D reference image.

In some embodiments, the method further includes filtering the at least one 3D training image; and wherein estimating the 3D reference image based on the at least one 3D training image includes estimating the 3D reference image based on the at least one filtered 3D training image.

In some embodiments, the method further includes filtering the 3D reference image; and wherein estimating the 3D variance model based on the 3D reference image includes estimating the 3D variance model based on the filtered 3D reference image.

In accordance with another embodiment of the invention, methods are disclosed for three dimensional (3D) vision inspection using a 3D vision system. The method comprises acquiring at least one 3D image of a 3D object using the 3D vision system; using the 3D vision system, extracting a 3D visible runtime mask of the 3D image; using the 3D vision system, comparing the 3D runtime visible mask to a 3D reference visible mask; and using the 3D vision system, determining if a difference of pixels exists between the 3D runtime visible mask and the 3D reference visible mask.

In some embodiments, the method further comprises determining if a difference of pixels exceeds a 3D variance model.

In some embodiments, the method further comprises building a care mask.

In some embodiments, the method further comprises applying the care mask to the at least one 3D image.

In some embodiments, the care mask can be built by a combination of the 3D vision system and user input.

In some embodiments, the method further comprises using the care mask to limit the area of comparison between the 3D reference visible mask and the 3D runtime visible mask.

In some embodiments, the method further comprises using the care mask as a binary mask in the comparison, and eliminating those pixels not contained within the care mask.

In some embodiments, the method further comprising using the care mask as a weighted mask, and giving more weight to pixels within one portion of the care mask, and less weight to pixels in other areas of the care mask.

In accordance with another embodiment of the invention, methods are disclosed for three dimensional (3D) vision inspection using a 3D vision system. The method comprises acquiring at least one 3D image of a 3D object using the 3D vision system; using the 3D vision system, registering the at least one 3D image to a 3D reference image; using the 3D vision system, comparing the at least one 3D image to the 3D reference image; and using the 3D vision system, detecting a 3D difference between the at least one 3D image and the 3D reference image.

In some embodiments, the 3D difference exceeds a 3D variance model.

In some embodiments, the method further includes filtering the at least one 3D image; and wherein registering the at least one 3D image to the 3D reference image includes registering the at least one filtered 3D image to the 3D reference image.

In some embodiments, the method further includes filtering the at least one filtered 3D image; and wherein comparing the at least one filtered 3D image to the 3D reference image includes comparing the filtered at least one filtered 3D image to the 3D reference image.

In some embodiments, detecting the 3D difference between the at least one 3D image and the 3D reference image includes detecting the 3D difference between the at least one filtered 3D image and the 3D reference image.

In some embodiments, the method further includes training the 3D vision system, the training including: acquiring at least one 3D training image of the 3D object using the 3D vision system; using the 3D vision system, estimating the 3D reference image based on the at least one 3D training image; and using the 3D vision system, estimating a 3D variance model based on the 3D reference image.

In some embodiments, the method further includes filtering the at least one 3D training image; and wherein estimating the 3D reference image based on the at least one 3D training image includes estimating the 3D reference image based on the at least one filtered 3D training image.

In some embodiments, the method further includes filtering the 3D reference image; and wherein estimating the 3D variance model based on the 3D reference image includes estimating the 3D variance model based on the filtered 3D reference image.

In some embodiments, comparing the at least one 3D image to the 3D reference image, and detecting a 3D difference between the at least one 3D image and the 3D reference image further comprises: using the 3D vision system, registering the at least one 3D image to the 3D reference image; using the 3D vision system, comparing the registered at least one 3D image to the 3D reference image; and using the 3D vision system, detecting a 3D difference between the registered at least one 3D image and the 3D reference image.

BRIEF DESCRIPTION OF THE DRAWINGS

FIG. 5 is a chart listing multiple 3D camera specifications.

DETAILED DESCRIPTION OF THE PREFERRED EMBODIMENT

Figure 1:
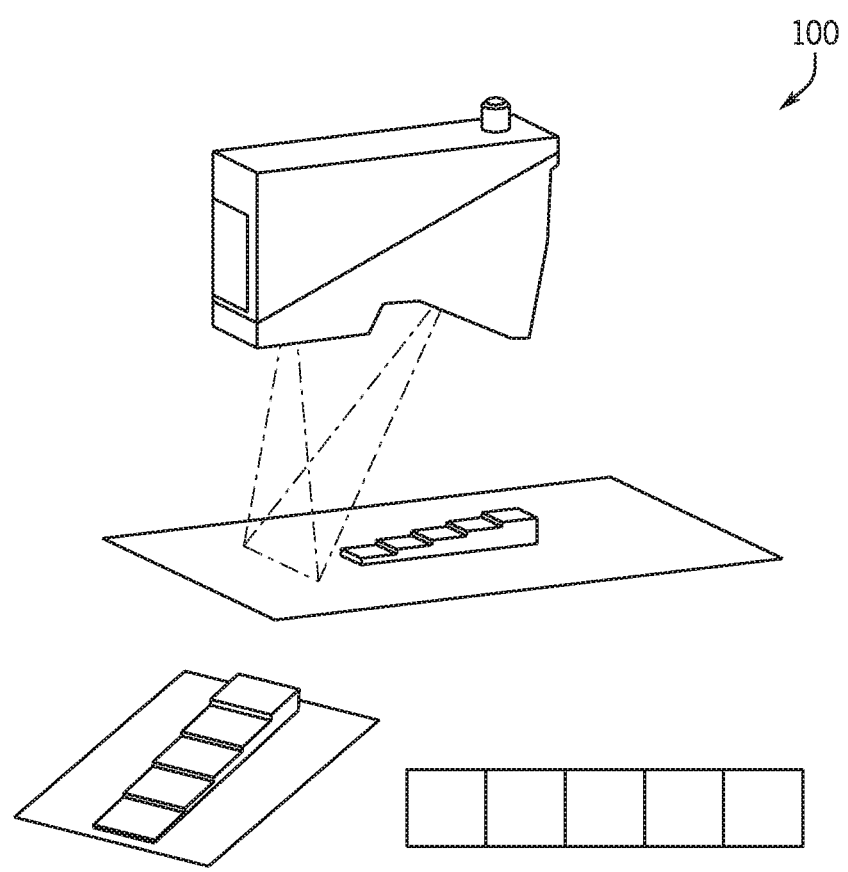
FIG. 1 is an illustrative view showing the principal of operation of a laser profile sensor.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

The following discussion is presented to enable a person skilled in the art to make and use embodiments of the invention. Various modifications to the illustrated embodiments will be readily apparent to those skilled in the art, and the generic principles herein can be applied to other embodiments and applications without departing from embodiments of the invention. Thus, embodiments of the invention are not intended to be limited to embodiments shown, but are to be accorded the widest scope consistent with the principles and features disclosed herein. The following detailed description is to be read with reference to the figures, in which like elements in different figures have like reference numerals. The figures, which are not necessarily to scale, depict selected embodiments and are not intended to limit the scope of embodiments of the invention. Skilled artisans will recognize the examples provided herein have many useful alternatives and fall within the scope of embodiments of the invention.

Automated inspection has been an important task in industrial computer vision for decades. It is a primary application along with guidance (e.g. guiding robots for assembly), identification/recognition (e.g. reading barcodes, characters, or matching by color, shape, or texture), and gauging (dimensional measurement).

For purposes of this application, inspection can be defined as either finding defects or determining if manufacturing processes are remaining within tolerances. A defect can be defined as a measured feature that has varied outside of an acceptable range, as one non-limiting example.

There are many examples of quality inspection in 2D industrial computer vision. These quality inspections can be classified into four groups: surface inspections, dimensional inspections, structural inspections, and operational inspection. Another way of classifying 2D industrial computer vision tasks are by the degrees of freedom measured by the system: pose, size, shape, color, texture, or illumination.

One reason to consider 3D vision for industrial inspection instead of 2D vision is when the 2D inspection is inadequate. This can occur if the inspection feature is characterized by physical size, area, or volume more accurately or robustly extracted from a 3D image than a 2D image and if the 3D image's cost is not too high. When this is true, it is likely that 3D image data will be used.

When comparing 3D computer vision using 3D cameras and 3D datasets with 2D computer vision and 2D imagery, many elements are familiar. These include cameras and camera calibration, multidimensional image data and their associated representation issues, image filtering for noise removal or signal enhancement, and image registration or pose estimation. The details of each element are quite different even comparing a 2D image with a 3D image of the same part.

Non-limiting examples of the 3D objects that could be imaged to search for defects can include brackets, turbine blades, toothbrushes, or tiles. These, and other objects, can be made of may different types of materials; for example, metal, plastic, wood and/or ceramic. The 3D objects can have surface finishes varying from rough to smooth, and can have any color or pattern.

Figure 2:
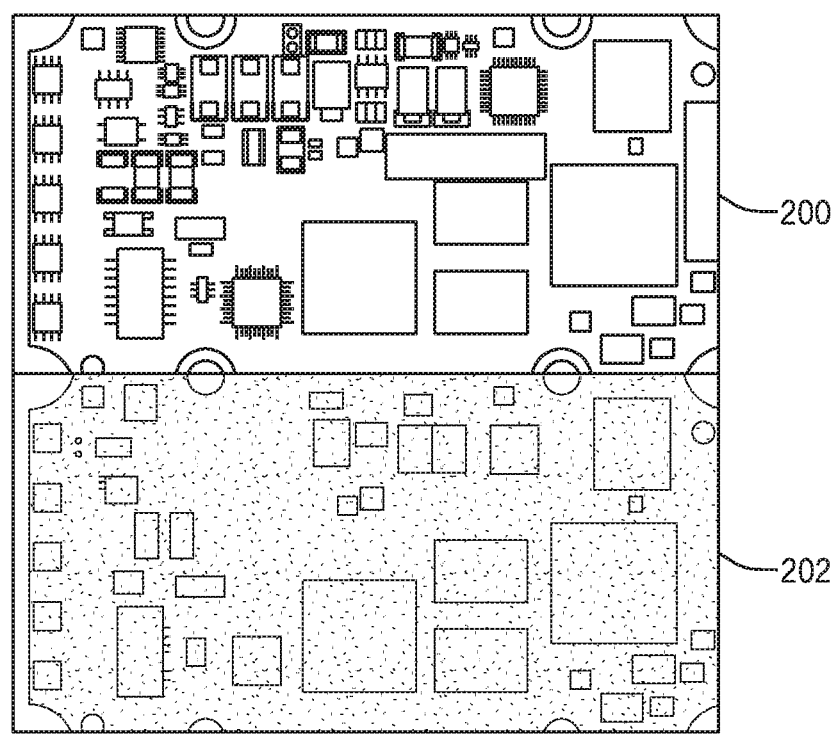
FIG. 2 is a top view of a 2D printed circuit board and a 3D image of the printed circuit board using a range image representation.

FIG. 1 illustrates a principal of operation of a laser profile sensor 100. Based on triangulation, the camera and laser can view an object from a baseline separation distance. Since the position of the viewed laser line directly corresponds to the height of the object, these positions can be converted into 3D height data in the form of a range image or a point cloud. Note that this only creates a single row of 3D height data. In order to cover the entire object either the camera or object must be moved. Typically, the object moves under the camera on a motion stage or conveyor belt or the camera is moved by a robot. FIG. 2 illustrates a top view of a 2D printed circuit board 200, and a 3D image of a printed circuit board using a range image representation 202.

Figure 3:
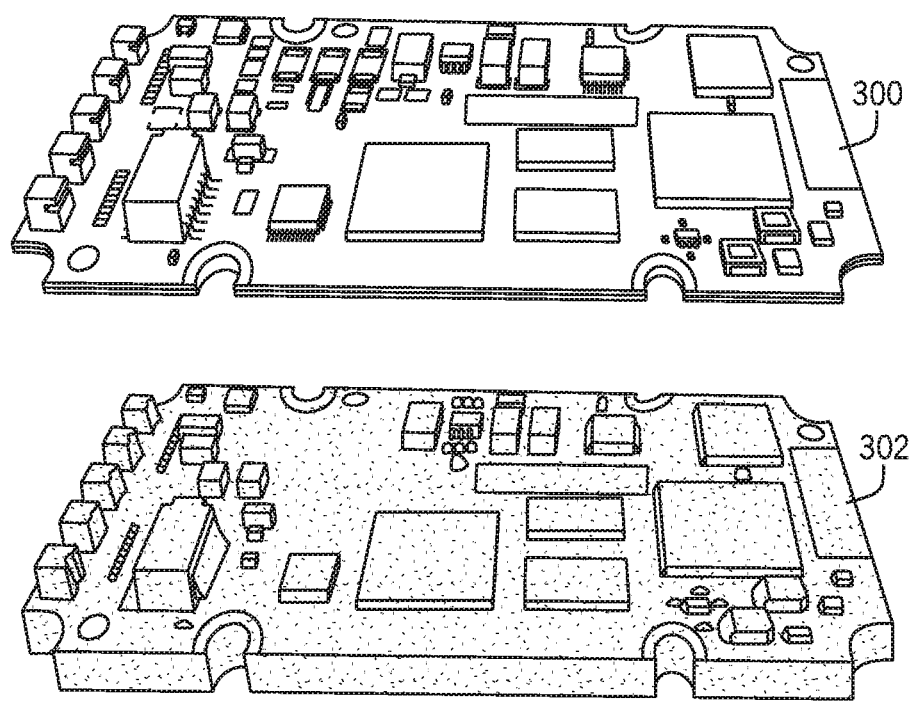
FIG. 3 is a perspective view of a $2d$ image of a printed circuit board and a 3D image of the same printed circuit board.

FIG. 3 illustrates some of the differences between a 2D image of a printed circuit board 300 and a 3D image 302 of the same printed circuit board. The 2D image is a perspective mapping of the surface of the circuit board. It contains information about the patterns on the surface of the board—the albedo of the circuit board surface warped by the imaging optical system—and the incident illumination. The 3D images contain information about the 3D shape, size, and dimensions of the printed circuit board itself. The albedo values may slightly influence the apparent 3D shape, cause artifacts or may not be visible.

FIG. 3 also illustrates the differences between a 2D image of a printed circuit board and a 3D image of the same printed circuit board but with a perspective view. Notice that the 2D image can have quite a different appearance with strong perspective. The foreground is much wider. The background is narrower. On the other hand, the underlying 3D data in both figures is identical. The 3D image is just being displayed from a different viewpoint and the perspective is not encoded in the image data.

The camera hardware can also be quite different. A 3D industrial camera is generally more complex and can have a higher cost than a 2D industrial camera (which is becoming commoditized).

Calibration processes can be quite different between 2D and 3D cameras. With 2D vision, a fully calibrated camera (intrinsics and extrinsics estimated) does not imply calibration in object space except in special circumstances such as if the object is planar. With 3D vision, camera calibration can frequently lead to object space calibration. That is, in 3D vision calibrated object dimensions—physical dimensions—can be available.

In 2D industrial computer vision systems camera optics are frequently flexible and interchangeable. Consequently, choosing 2D camera lenses is done by the system integrator who must perform any needed lens calibration. This flexibility is rarely available with 3D cameras, as lenses or optical configurations are typically fixed by the manufacturer. However, this can have a benefit in that calibration (or partial calibration) can be accomplished by the 3D camera manufacturer at manufacturing time. But it does put more responsibility on the system integrator to choose the correct 3D camera specifications where swapping a lens is not an option.

Image representations can also be different in 3D. In 2D vision an image is nearly always represented as a 2D array of monochrome or color intensities. In 3D vision, an image can be a collection of 3D points—a point cloud—or a 2D array of depth/height values—a range image representation of a visible surface—or a 3D array of scalar or vector measurements—a dense volume representation. Any processing needs to accommodate the image representation.

Additionally, noise can be different in 3D image data. The cameras may not acquire dense 3D data due to occlusion or poor signal return. And the camera may know where it is missing image data. Noise may take the form of ghost reflections or isolated points depending on the details of the 3D camera. The choice of image filtering in 3D for noise removal should depend on the specific characteristics of the 3D camera.

Accordingly, a 3D vision system can be used for industrial inspection, and will be described in more detail below. The approach to industrial inspection described in this application can, in some embodiment, be used for detecting 3D variations of manufactured parts that are outside of normal variations. Some examples of the defects can be material missing from a 3D object or material extra to the 3D object when that 3D object is compared with a 3D reference object. However, other defects, such as the position of a component, the height of a component, the orientation of a component, etc., can also be detected using a 3D vision system.

Figure 4:
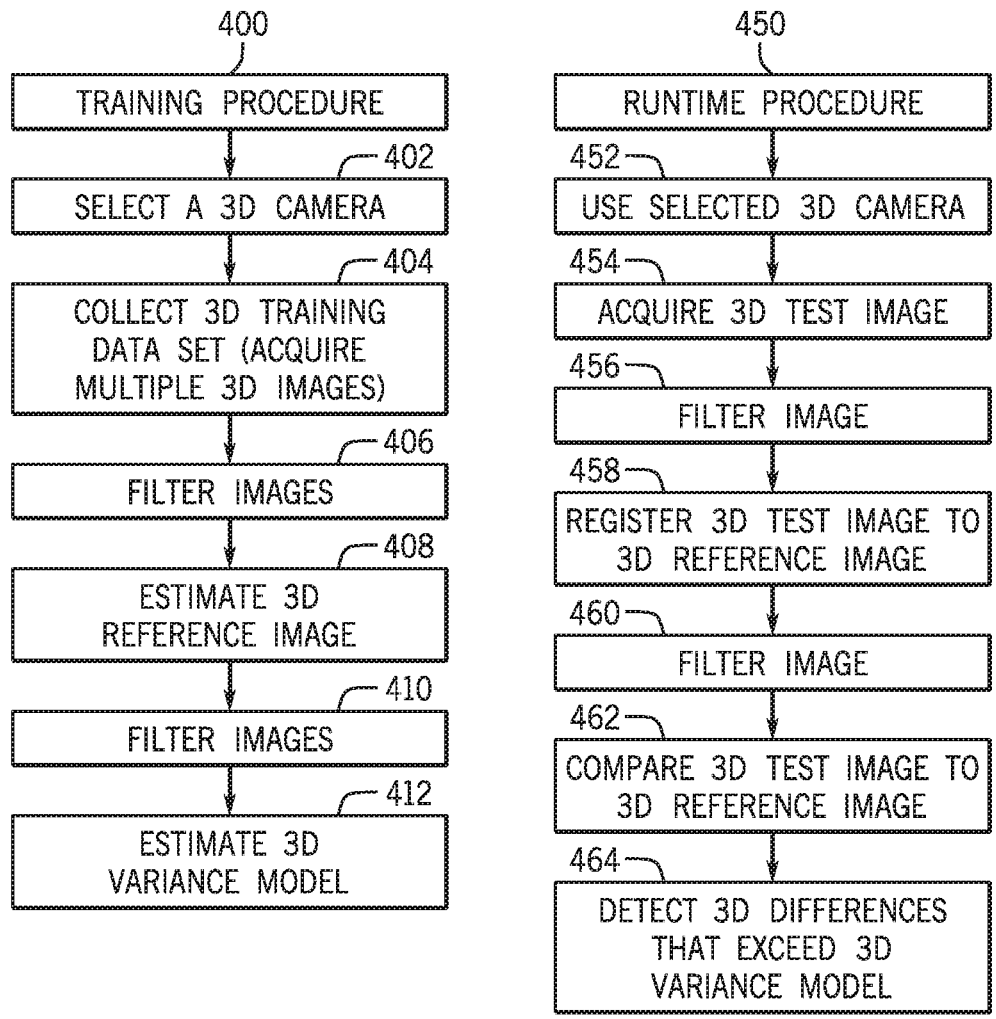
FIG. 4 is a flow-chart illustrating a training phase and a run time phase for a 3D inspection process.

FIG. 4 summarizes the 3D inspection approach. The approach is broken up into a training phase 400 which can take place when the inspection is set up and both a reference alignment template and normal variations are both estimated. Additionally, there is a run time phase 450 where a test part can be imaged, registered to, and compared with a "golden part," (for alignment this is the reference alignment template) and where defects can be detected if they exceed normal variation on the test part.

Training phase 400 can occur during a set-up process. It is associated with collecting 3D images of the objects to be inspected that have acceptable variations ("training images") and understanding those variations. Further, collecting representative data is a critical part of successful inspections. The representative dataset can be used to build and validate a reference alignment model. The representative dataset can also be used to build and validate a variance model. The training steps, as described in more detail below, includes: collect multiple examples of "good" samples and acquire 3D images of good samples ("training images"); 2) align to one another (or to the first one) "good" samples using Point Cloud Alignment or other suitable 3D alignment techniques; and 3) learn acceptable variation of good parts from all aligned samples, either incrementally or in "batch mode" (e.g., build statistical part—mean+standard deviation of each surface patch.)

At block 402 a 3D camera can be selected. There are many industrial 3D cameras available commercially from different vendors using different imaging principles. Examples of the imaging principles involved are Shape-from techniques, Stereo, Structured Light, Time-of-Flight and Light field generation. Examples of available 3D imaging devices can include laser light profile cameras such as the DS1000 series from Cognex Corporation, time-of-flight cameras such as the Kinect V2 from Microsoft, and stereo cameras such as the Realsense 3D camera from Intel.

The imaging principles involved may limit what can be inspected due to ambient light restrictions, limited motion capture ability, surface properties, noise characteristics or resolution. However, even if the imaging principles allow for inspection, 3D cameras typically have fixed optics. Consequently, unlike selecting a 2D camera which limits only pixel resolution, size, format, and interface, 3D cameras typically also have fixed working distance, field of view, illumination, and resolution in x, y, and z. FIG. 5 is an example of 3D camera specifications 500. The result is that choosing a 3D camera must be done carefully.

Additionally, 3D image data is unlike a 2D image in that 3D image data can have different representations such as a point cloud (collection of 3D points with x, y, z coordinates that come from the imaging device) or a range image (a 2D array of z depth or z height data).

During the training phase, at process block 404, multiple 3D images can be acquired to collect a 3D training data set. The 3D images with acceptable variations can then be selected to create a 3D alignment model that can be used to align the training images to one another and that allow estimating mean and variance data. Additional images can also be collected for further validation and testing.

At process block 406, the acquired images can be filtered. In one embodiment, the images can be filtered to have artifacts removed in order to improve alignment. The goal is to remove artifacts that would reduce the accuracy of alignment. Such artifacts could be ghost spikes that result from specular highlights on a part. A spike can be defined as an isolated point distant from the surface of the part. Removing these artifacts requires detecting them. Separate and/or independent filtering can be used to remove artifacts for alignment and artifacts for inspection. The inspection filtering can happen at a later stage. Possible, non-limiting examples of filters can include: interpolating across missing data from detected occlusion, removing imaging artifacts such as isolated pixels (spikes or holes), and density normalization. This filtering can also be used for selecting the image resolution for alignment and insuring that the training images have the same image resolution. The filtering can also be used to remove outliers or small regions that should not be considered during inspection. Additionally, the filtering can be done using commercial software like Cognex VisionPro or using open source tools.

At process block 408, the 3D reference image can be estimated. A 3D alignment model can be generated using the 3D images with acceptable variations as determined during the filtering step 406. The 3D alignment model can be used to estimate the relative alignment —translation and rotation—of the training images to that alignment model either one at a time, incrementally, or all at once, in a batch mode. Estimating this relative alignment can be done using 3D alignment techniques that are known in the art to align 3D images to one another. For example, using commercial image registration tools such as those present in the Cognex VisionPro toolkit, or using open-source registration tools such as the PCL library available from http://www.pointcloud.org or 3DTK; or the 3D Toolkit available from http://sourceforge.net/projects/slam6d/. Next, the 3D images can optionally be aligned to each other and be re-rendered into as close as possible alignment using the estimates of relative alignment obtained by the 3D registration tool. The re-rendering can be done by conventional 3D computer graphics techniques. Although this re-rendering step is optional, it is desirable because it simplifies the following step.

At process block 410, the images can be filtered again. The filtering step at process block 410 can be used to adjust the model's resolution for variance estimation to set the appropriate scale for finding the defects. Unlike the filtering for alignment, spikes and holes may be left in the image. Adjusting the model's resolution can be done directly on the range image data or by re-meshing the point cloud data.

Finally, at process block 412, the 3D variance model can be estimated. In one embodiment, statistics for each surface position or surface patch within the re-rendered or aligned 3D images can be estimated. These statistics can include the mean position, mean surface orientation, standard deviation of position, standard deviation of surface orientation, etc. Optionally, these 3D statistics can be collected at different resolutions in each dimension. Collecting the statistics can take missing pixels into account (e.g. some patches are not visible in some training images due to the viewpoint of the collected images). Generally, a missing pixel should not contribute to an image statistic for any surface position or patch. Collecting the statistics can also take into account the difficulties of estimating surface patches from 3D data (e.g. reflective and partially transparent parts can make it difficult to estimate mean surface patches).

Turning now to the runtime procedure 450, a process for acquiring a 3D image of a single test part, alignment of the image to a reference part, and determination of a defect being present can be seen. As will be described in more detail below, the runtime procedure 450 can generally include: 1) acquiring a "test" sample; 2) aligning the "test" sample using Point Cloud Alignment or other suitable 3D alignment techniques; 3) comparing the aligned "test" sample with "good" statistical parts determined during training procedure 400; and 4) identifying potential defects at each available image resolution. The potential defects correspond to candidate surface patches of "test" samples that exceed thresholds of differences from statistical parts (threshold X standard deviation), or candidate surface patches of mean "good" samples that exceed threshold differences from the "test" sample. The first set of defects can correspond to unmatched features in the "test" sample. The second set of defects can correspond to unmatched features in the "good" sample.

At process block 452, a user can select a 3D camera. It is critical to use the same camera and same imaging conditions as were used during the setup process while training. Otherwise, a camera variation or imaging variation could show up as a defect. At process block 454, a 3D test image can be acquired to look for a defect.

At process block 456, the acquired image can be filtered. The first filtering step can be to filter the image for alignment or pose estimation. A goal can be to remove artifacts that could reduce the accuracy or robustness of the alignment algorithm. Such artifacts could be ghost spikes that result from specular highlights on the part. A spike can be defined as an isolated point distant from the surface of the part. Removing these spikes or isolated points requires detecting them, removing them, a replacing them with either holes in the data or correctly interpolated data.

At process block 458, the 3D test image can be registered to a 3D reference image. An appropriate 3D alignment technique can then be used to find the translation and rotation of the test part relative to the reference image. This can be accomplished using commercial image registration tools such as those present in the Cognex VisionPro toolkit or using open source registration tools from the PCL library available from http://www.pointcloud.org or 3DTK, or the 3D Toolkit available from http://sourceforge.net/projects/slam6d/.

At process block 460, the image can be re-rendered and filtered. Here, the 3D image data can be re-rendered to be aligned with the reference image. The 3D image data can then be filtered to, typically, match surface density. Other 3D image data normalization filtering can happen in this step as well.

At process block 462, the 3D test image can be compared to the 3D reference image. Once the 3D test image has been aligned, filtered, and re-rendered, it can be directly compared with the reference 3D data. For example, surface patches or individual pixels can be directly compared. Differences can be noted as potential defects if they meet at least one of several statistical tests, as discussed below.

At process block 464, 3D image data differences that exceed the 3D variance model can be detected. To be considered a defect, the identified potential defects must satisfy at least one of several statistical tests. Examples of the statistical tests can include: 1) The distance from an aligned "test" sample surface patch is too large to the nearest mean surface patch on the "good" sample; 2) the orientation of an aligned "test" sample surface patch is too different from the orientation of the nearest mean surface patch on the "good" sample; 3) the distance from an aligned "good" sample surface patch is too large to the nearest mean surface patch on the "test" sample; or 4) the orientation of an aligned "good" sample surface patch is too different from the orientation of the nearest mean surface patch on the "test" sample. Each of the above statistical tests can be automatically selected by the system by setting either a fixed threshold or a multiple of standard deviations from the mean. The results of the statistical tests can be designated as defects.

Figure 6:
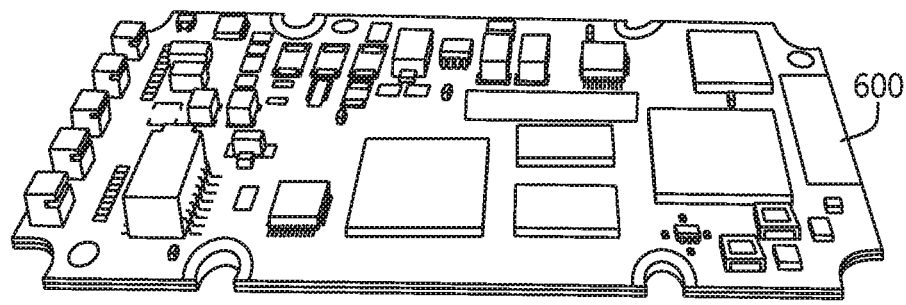
FIG. 6 is a 2D perspective view of defective printed circuit board.
Figure 7:
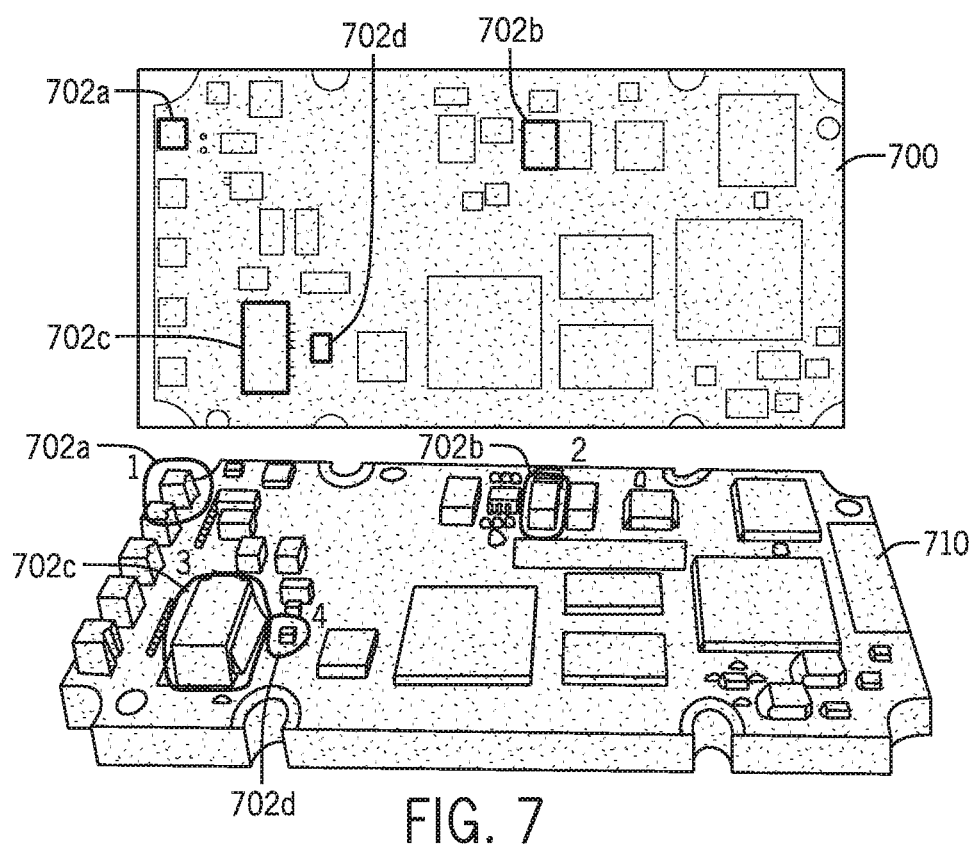
FIG. 7 is a range image view and a print cloud representation of the defective printed circuit board of FIG. 6.

FIG. 6 illustrates a 2D image of a defective printed circuit board 600. The board 500 shows four possible defects on the board corresponding to missing or misplaced components. FIG. 7 shows the 3D range image 700 of the defective printed circuit board 600 as a range image. The four defects identified by the statistical test correspond to reference numbers 702a-d. A 3D range image 710 shows the 3D image of the defective printed circuit board 600 viewed as a point cloud with the four defects 702a-d.

As discussed above, 3D alignment (aligning 3D images of objects) is substantially different from 2D alignment. For example, missing pixels due to self-occlusion, the viewing geometry of cameras and illuminators and missing parts of 3D images due to self occlusion have to be dealt with for both 3D alignment and 3D inspection. Additionally, identifying image difference is substantially different between 3D images and 2D images. For example, due to the noise of 3D point locations, point to point subtraction (as is done with 2D images) generally does not work effectively in 3D. Rather, plane-to-plane, or facet-to-facet comparisons at a given resolution can generally provide better data.

This application covered 3D industrial computer vision inspection. Industrial computer vision is increasingly adopting 3D imagery as an additional data source for inspection. This application described using 3D image data for automated visual inspection in industrial computer vision. Automated visual industrial inspection was defined and the differences between 3D industrial inspection and 2D industrial inspection were provided. Finally, examples were provided to give the technical details behind an automated 3D industrial inspection approach.

Figure 8:
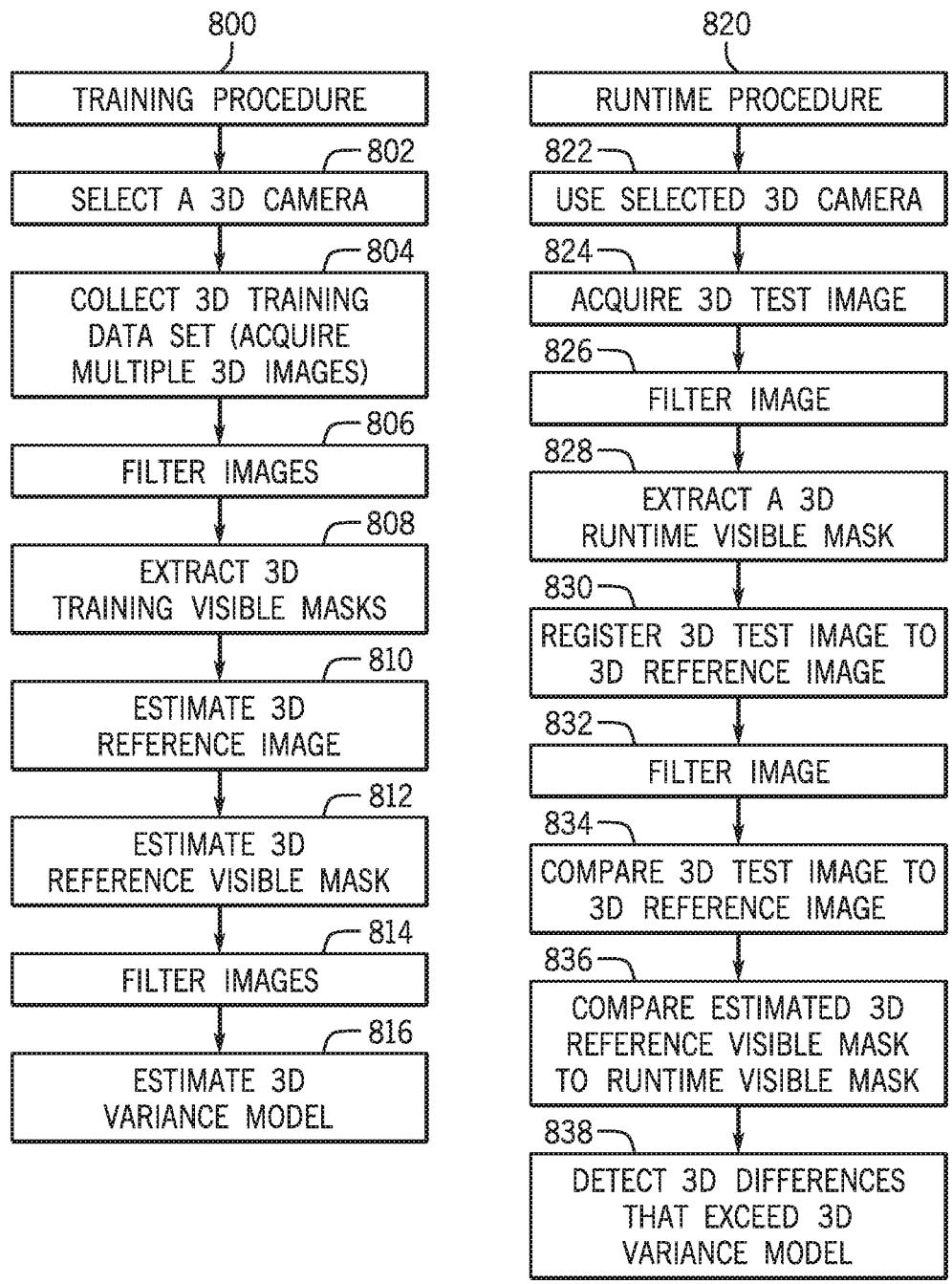
FIG. 8 is a flow-chart illustrating a training phase and a runtime phase for a 3D inspection process including visual masks.

Turning now to FIG. 8, a process for logically evaluating 3D images for missing pixels can be seen. Logically evaluating 3D images for missing pixels can allow images to be evaluated such that missing pixels can be evaluated to determine if the missing pixels are due to an absence of material in the imaged object, or if the missing pixels are the result of an imaging error, such as occlusion, self-occlusion, and/or image capture noise. The logical evaluation process of FIG. 8 can provide an analysis to provide the distinction between absent material and imaging errors. FIG. 8 summarizes a 3D inspection approach similar to that discussed in regards to FIG. 4. For example, the approach is broken up into a training phase 800 which can take place when the inspection is set up and both a reference alignment template and normal variations are both estimated. Additionally, there is a run time phase 820 where a test part can be imaged, registered to, and compared with a "golden part," (for alignment this is the reference alignment template) and where defects can be detected if they exceed normal variation on the test part.

The training procedure 800 can perform the steps of selecting a 3D camera at process block 802, collecting 3D training data sets (multiple 3D image acquisition) at process block 804 and filter images at process block 806. These processes can operate the same as those discussed in regards to the training procedure 400 described above. At process block 808, a 3D visible training mask can be extracted. In one embodiment, the 3D visible training mask can be automatically extracted by the 3D camera. Alternatively, a user can select an area of the acquired images as the 3D training visible mask. Further, the 3D training visible mask can be extracted through a combination of automatic generation by the 3D camera, and user specification. In other embodiments, the 3D training visible mask can be extracted by an external device, such as a controller, a computer, or other applicable device. The 3D training visible mask can evaluate the filtered images to detect the presence or absence of pixels in the images filtered in process block 806.

Once the 3D training visible mask is extracted at process block 808, a 3D reference image can be estimated at process block 810. The 3D reference image can be estimated as described above in training procedure 400. Once the 3D reference image has been estimated at process block 810, a 3D reference visible mask can be estimated at process block 812. Similar to the method described above for estimating the 3D reference image, the 3D reference visible mask can be estimated using the 3D training visible masks extracted at process block 808. A 3D alignment model can be used to estimate the relative alignment—translation and rotation—of the 3D training visible masks to that alignment model either one at a time, incrementally, or all at once, in a batch mode. Estimating this relative alignment can be done using 3D alignment techniques that are known in the art to align 3D images to one another. For example, using commercial image registration tools such as those present in the Cognex VisionPro toolkit, or using open-source registration tools such as the PCL library available from http://www.pointcloud.org or 3DTK; or the 3D Toolkit available from http://sourceforge.net/projects/slam6d/. Next, the 3D images can be aligned to each other and be re-rendered into as close as possible alignment using the estimates of relative alignment obtained by the 3D registration tool. The re-rendering can be done by conventional 3D computer graphics techniques. Although this re-rendering step is optional, it is desirable because it simplifies the following step.

Once the 3D reference visible mask is estimated at process block 812, the estimated 3D reference images can be filtered at process block 814, and a 3D variance model can be estimated at process block 816. The 3D variance model 816 can be estimated using the process described in training procedure 400 discussed above.

A runtime procedure 820 can then be performed upon completion of the training procedure 800. The runtime procedure 820 can use 3D cameras selected in process block 802 at process block 822 to acquire at least one or a plurality of 3D test images at process block 824. In one embodiment, three test images can be acquired at process block 824. The test images can then be filtered at process block 826. The use of selected cameras to acquire the test images, and the subsequent filtering of the acquired image in process blocks 822, 824 and 826, respectively, can be performed using the methods described in runtime procedure 450, described above. At process block 828, a 3D runtime visible mask can be extracted. In one embodiment, the 3D runtime visible mask can be automatically extracted by the 3D camera. Further, the 3D runtime visible mask can extracted through a combination of automatic generation by the 3D camera, and user specification. In other embodiments, the 3D runtime visible mask can be extracted by an external device, such as a controller, a computer, or other applicable device. The 3D runtime visible mask can evaluate the filtered images to detect the presence or absence of pixels in the images filtered in process block 826.

At process block 830, the 3D test image can be registered to a 3D reference image, similar to that described in runtime procedure 450, described above. At process block 832, the image can be re-rendered and filtered. Here, the 3D image data can be re-rendered to be aligned with the reference image. The 3D image data can then be filtered to, typically, match surface density. Other 3D image data normalization filtering can happen in this step as well.

At process block 834 the 3D test image can be compared to the 3D reference image as described in runtime procedure 450, described above. At process block 836, the 3D Reference Visible Mask can be compared to the 3D Runtime Visible Mask. As opposed to the comparison, of the 3D images in process block 834, the comparison performed at process block 836 can use a logical comparison process to verify that mixing pixels are accurately accounted for. Example comparison methods can include using logical operators (AND, OR, XOR, etc.). For example, an AND operator can be used to compare the 3D Reference Visible Mask with the 3D Runtime Visible Mask. Where an AND operator is used, a logical "1" value will only be output if a pixel is present in both the 3D Reference Visible Mask, and the 3D Runtime Visible Mask. In comparison, a logical "1" will be output if a pixel is present in at least one of the 3D Reference Visible Mask, and the 3D Runtime Visible Mask. Alternatively, other comparison methods can be used, including averaging, median analysis, voting systems, and/or alignment methodologies such as the one discussed above.

By comparing the estimated 3D reference visible mask to the 3D runtime visible mask, it is possible to verify that the absence of any pixels is due to the absence to material on an object, and not imaging errors, such as those caused by occlusion, imaging noise, etc. Further, the above methodology allows for both the training images and the runtime images to be effectively evaluated for the presence or absence of pixels in the captured images. For example, the above analysis can determine if a given pixel is present in the training procedure 800 and absent in the runtime procedure 820; absent in the training procedure 800 and present in the runtime procedure 820; or, absent in both the training procedure 800 and the runtime procedure 820. This information can be used to further evaluate the acquired 3D images. Additionally, the comparison data can be used in a statistical analysis of an acquired 3D images, such as the statistical analysis described above.

Figure 9:
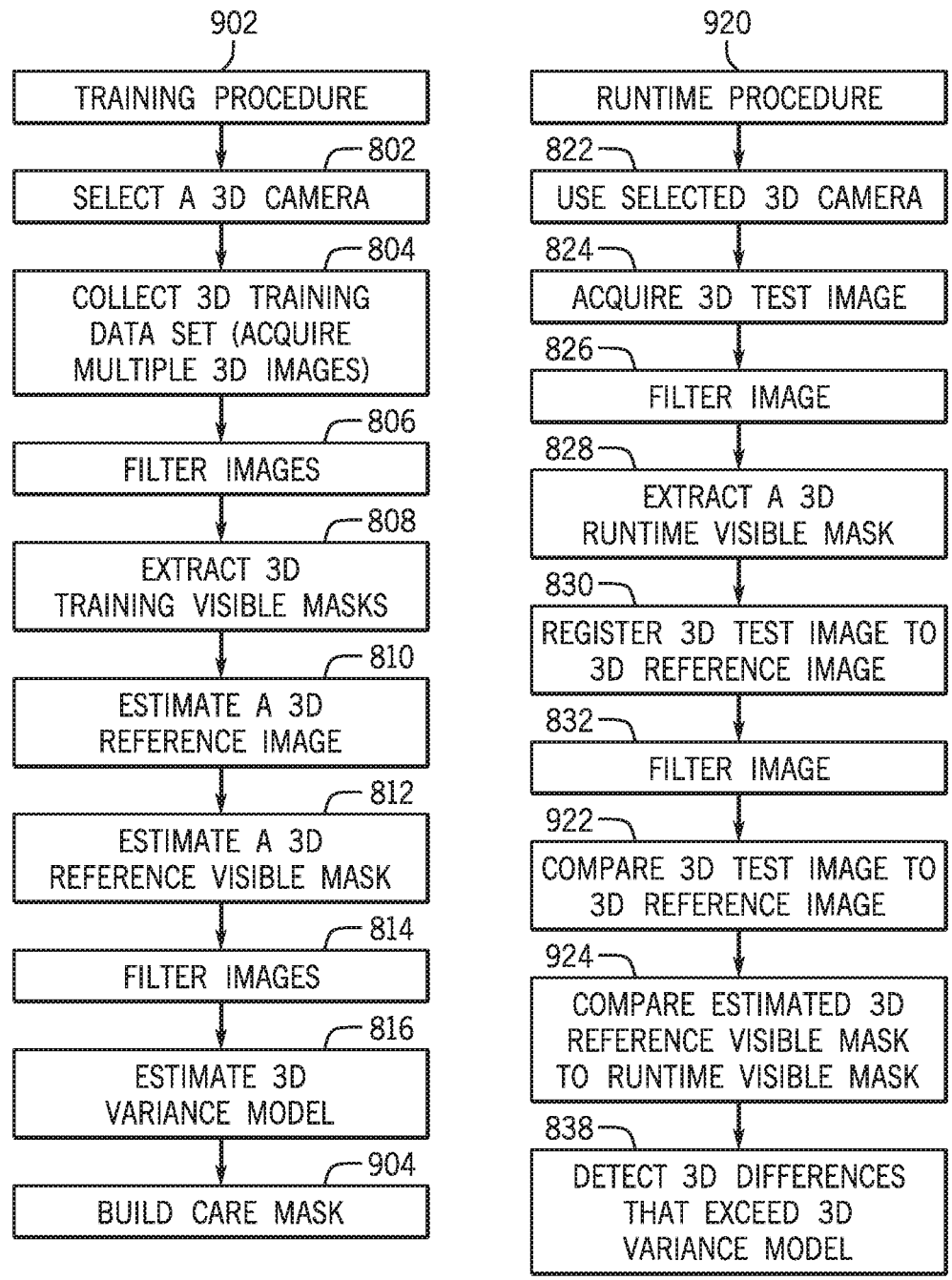
FIG. 9 is a flow-chart illustrating a training phase and a runtime phase for a 3D inspection process using an optional care mask.

Turning now to FIG. 9, a process 900 for logically evaluating 3D images can be seen. The process 900 contains similar steps to those shown in FIGS. 4 and 8, described above. Process 900 includes a training procedure 902. Training procedure includes process blocks 802, 804, 806, 808, 810, 812, 814, and 816 as described above in regards to FIG. 8. At process block 904, an optional care mask can be built. The care mask can be used to select an area of interest of the 3D object. In one embodiment, the area of interest selected by the care mask can be a 2D area of the 3D object. Alternatively, the area of interest selected by the care mask can be a 3D area of the 3D object. Additionally, the area of interest selected by the care mask can be one or more specific pixels of an acquired image of a 3D object. For example, the area of interest selected by the care mask can be a set of specific pixels of an acquired image of a 3D object. The care mask can be built by a user. For example, the user can select the area of the 3D image that should be included in the care mask. Alternatively, the care mask can be automatically built by the imaging system. Further, the care mask can be built by a combination of the imaging system and user input.

At process block 920 a runtime procedure can be seen. The runtime procedure 920 can include process blocks 822, 824, 826, 828, 830, 832, and 838 as described in regards to FIG. 8. At process block 922, the 3D test image can be compared to the 3D reference image and the care mask. The care mask can limit the area of comparison between the 3D test image and the 3D reference image. In one embodiment, the care mask can be used as a binary mask in the comparison, thereby eliminating those pixels not contained within the care mask. Alternatively, the care mask can be used as a weighted mask, thereby giving more weight to pixels within one portion of the care mask, and less weight to pixels in other areas of the care mask. As stated above, the care mask can be built by a user, and therefore, the user can specify the weighting provided by portions of the care mask in process block 904.

At process block 924, the estimated 3D reference visible mask can be compared to the 3D runtime visible mask using the care mask. The care mask can limit the area of comparison between the 3D reference visible mask and the 3D runtime visible mask. In one embodiment, the care mask can be used as a binary mask in the comparison, thereby eliminating those pixels not contained within the care mask. Alternatively, the care mask can be used as a weighted mask, thereby giving more weight to pixels within one portion of the care mask, and less weight to pixels in other areas of the care mask.

What is claimed is:

1. A method for three dimensional (3D) vision inspection using a 3D vision system, the method comprising:
   acquiring at least one 3D image of a 3D object using the 3D vision system;
   using the 3D vision system, registering the at least one 3D image to a 3D reference image;
   using the 3D vision system, comparing the at least one registered 3D image to the 3D reference image;
   using the 3D vision system, detecting a defect in the 3D object based on detecting a 3D difference between the at least one registered 3D image and the 3D reference image, wherein the 3D difference exceeds a 3D variance model;
   wherein the 3D variance model includes estimated statistics for surface positions or surface patches within the 3D reference image; and
   wherein the defect is detected based on the 3D difference exceeding a fixed threshold or a multiple of a standard deviation of a corresponding surface position or patch of the 3D variance model.

2. The method according to claim 1, further including filtering the at least one 3D image; and
   wherein registering the at least one 3D image to the 3D reference image includes registering the at least one filtered 3D image to the 3D reference image.

3. The method according to claim 2, further including filtering the registered at least one filtered 3D image; and
   wherein comparing the registered at least one filtered 3D image to the 3D reference image includes comparing the registered at least one filtered 3D image to the 3D reference image.

4. The method according to claim 3, wherein detecting the 3D difference between the registered at least one 3D image and the 3D reference image includes detecting the 3D difference between the registered at least one filtered 3D image and the 3D reference image.

5. The method according to claim 1, further including training the 3D vision system, the training including:
   acquiring at least one 3D training image of the 3D object using the 3D vision system;
   using the 3D vision system, estimating the 3D reference image based on the at least one 3D training image; and
   using the 3D vision system, estimating a 3D variance model based on the 3D reference image.

6. The method according to claim 5, further including filtering the at least one 3D training image; and
   wherein estimating the 3D reference image based on the at least one 3D training image includes estimating the 3D reference image based on the at least one filtered 3D training image.

7. The method according to claim 5, further including filtering the 3D reference image; and
   wherein estimating the 3D variance model based on the 3D reference image includes estimating the 3D variance model based on the filtered 3D reference image.

8. A method for three dimensional (3D) vision inspection using a 3D vision system, the method comprising:
   acquiring at least one 3D image of a 3D object using the 3D vision system;
   using the 3D vision system, extracting a 3D runtime visible mask of the 3D image;
   using the 3D vision system, comparing the 3D runtime visible mask to a 3D reference visible mask;
   using the 3D vision system, determining if a difference of pixels exists between the 3D runtime visible mask and the 3D reference visible mask; and
   using the 3D vision system, detecting a defect in the 3D object based on a difference of pixels existing between the 3D runtime visible mask and the 3D reference visible mask, wherein the difference of pixels for a candidate surface patch of the 3D object exceeds a statistical threshold.

9. The method of claim 8, further comprising determining if a difference of pixels exceeds a 3D variance model.

10. The method of claim 8, further comprising building a care mask and applying the care mask to the at least one 3D image.

11. A method for three dimensional (3D) vision inspection using a 3D vision system, the method comprising:
    training the 3D vision system by:
      acquiring a plurality of 3D training images using the 3D vision system; and
      using the 3D vision system, estimating a 3D reference image based on the plurality of 3D training images; and
    acquiring at least one 3D image of a 3D object using the 3D vision system;
    using the 3D vision system, registering the at least one 3D image to the 3D reference image;
    using the 3D vision system, comparing the at least one registered 3D image to the 3D reference image; and
    using the 3D vision system, detecting a 3D difference between the at least one registered 3D image and the 3D reference image.

12. The method according to claim 11, wherein the 3D difference exceeds a 3D variance model.

13. The method according to claim 11, further including filtering the at least one 3D image; and
    wherein registering the at least one 3D image to the 3D reference image includes registering the at least one filtered 3D image to the 3D reference image.

14. The method according to claim 13, further including filtering the registered at least one filtered 3D image; and
wherein comparing the at least one filtered 3D image to the 3D reference image includes comparing the registered at least one filtered 3D image to the 3D reference image.

15. The method according to claim 13, wherein detecting the 3D difference between the at least one registered 3D image and the 3D reference image includes detecting the 3D difference between the at least one filtered 3D image and the 3D reference image.

16. The method according to claim 11, wherein training the 3D vision system includes using the 3D vision system, estimating a 3D variance model based on the 3D reference image; and
wherein the method further includes identifying a potential defect in the 3D object based upon detecting that the 3D difference exceeds the 3D variance model.

17. The method according to claim 11, further including filtering at least one of the 3D training images; and
wherein estimating the 3D reference image based on the plurality of 3D training images includes estimating the 3D reference image based on the at least one filtered 3D training image.

18. The method according to claim 16, further including filtering the 3D reference image; and
wherein estimating the 3D variance model based on the 3D reference image includes estimating the 3D variance model based on the filtered 3D reference image.

* * * * *